Dec. 31, 1935.   F. L. GRIER   2,026,087
NOSE PAD FOR EYEGLASSES
Filed Dec. 29, 1934
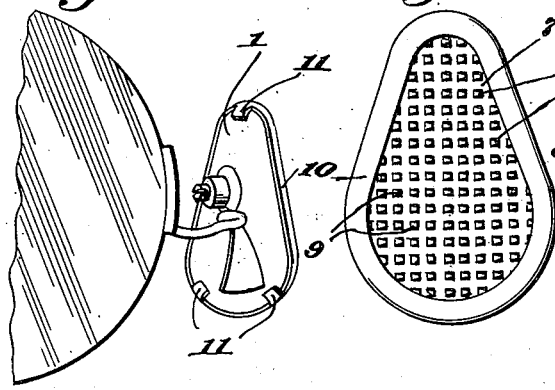
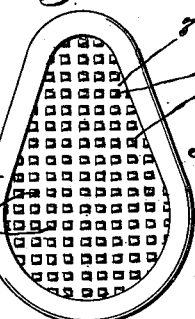
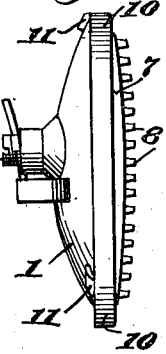
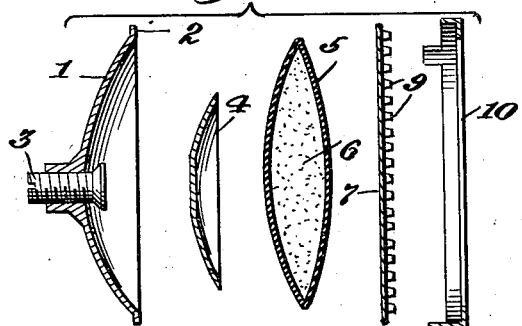
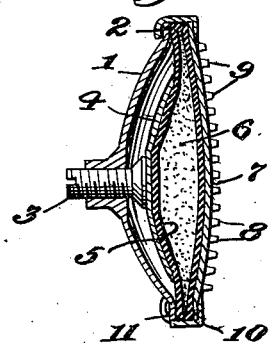
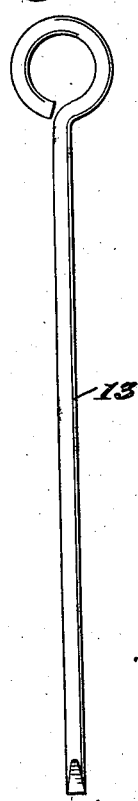
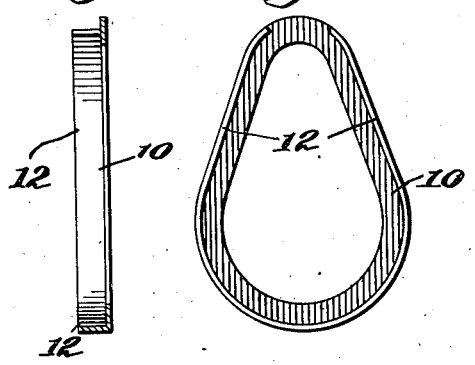
Inventor:
Frank L. Grier,
by Donald L. Mayson.
Att'y.

Patented Dec. 31, 1935

2,026,087

UNITED STATES PATENT OFFICE 2,026,087

NOSE PAD FOR EYEGLASSES

Frank L. Grier, Milford, Del.

Application December 29, 1934, Serial No. 759,792

5 Claims. (Cl. 88—49)

This invention relates to to improvements in nose pads for eyeglasses, and more particularly to a pad which will include a shell, a follower, an inner tube or sac, a substantially flexible nose contacting boot, and a detachable cap member for holding the several parts in the shell.

An object of the invention is to provide a nose pad for eyeglasses which will be so formed that the nose contacting portion of the pad will be conformable to the contour of the nose, and will have its outer surface formed with a plurality of integrally formed tits, which will be arranged to slide on the surface of the nose when the eyeglasses are being positioned, but will bite into or impinge into the surface of the nose when the pad is moved in the opposite direction when still in contact with the nose.

Another object of the invention is to provide a nose pad for eyeglasses which will include a conformable inner sac filled with any desired liquid or substance, which will permit shaping of the sac to the shape of the nose contacting boot adjacent the sac when pressure is applied to the associated follower which contacts the inner side or portion of the sac.

A further object of the invention is to provide a nose pad for eyeglasses which will include a conformable sac and a shapable nose engaging member or boot, and which will be supported in assembled position by means of a loose fitting ring, which will be self-adjusting and provided with a multiple point engagement with the pad shell or have a full surface contact.

A still further object of the invention is to provide a nose pad for eyeglasses which will include an inner tube or sac or sponge rubber shaped similarly to shape of sac and means for adjusting the pad to secure the surface pressure and contact with the nose desired by the wearer.

Other objects will appear as the description proceeds.

In the accompanying drawing which forms a part of my application,

Figure 1 is a fragmentary perspective view of a lens showing my invention applied thereto;

Figure 2 is a front elevation of my improved nose pad;

Figure 3 is a side elevation of my improved nose pad;

Figure 4 is an exploded view of the several portions of the nose pad;

Figure 5 is a vertical sectional view through my improved nose pad;

Figure 6 is a bottom plan view of the locking ring for the shell of the nose pad;

Figure 7 is a vertical sectional view through the locking ring, and

Figure 8 is an enlarged view of a screw driver which in practice will be about the size of a common pin.

Like characters of reference are used throughout the following specification and the accompanying drawing to designate corresponding parts.

In carrying out my invention, I provide a hollow metal shell 1 formed with a peripheral flange 2, and a threaded follower screw 3 extending through the shell, and a follower plate 4, which may be swiveled to the screw 3, or made detachable, as desired.

An inner tube or sac 5 formed from thin rubber or any desired conformable material will be filled with any suitable liquid or material, such as sand or the like. A celluloid boot 7 will be cut to the shape of the shell and will be conformable to the surface of the nose which it is adapted to engage. The outer surface of the boot 7 will be formed with a plurality of integrally formed tits 8, which are arranged to provide a plurality of raised shoulders 9 all extending in the same direction, and each shoulder tapering in an opposite direction to merge with the surface of the boot, thereby permitting the surface of the boot to slide along the skin surface when moved in one direction, and to bite into or impinge against the skin surface when slid in the opposite direction. It will be understood that the surface of the pads will slide readily when being positioned on the nose of the wearer, but the shoulders will prevent the sliding off of the eyeglasses when once positioned on the nose.

A locking or cover ring 10 will be provided with a plurality of depending fastening teeth 11 which will lock under the peripheral flange 2 of the shell 1, to hold the ring loosely on the shell. The screwing in on the follower will cause the liquid or material 6 in the sac 5; or sponge rubber to compress, whereby the sac or sponge rubber will be forced against the under surface of the boot 7, and will force its way between the peripheral flange 2 of the shell 1, and the peripheral edge of the boot 7, thus taking up the loose fit of the locking ring 10. At the same time, the outer surface of the boot 7 will extend beyond the level of the outer surface of the locking ring, and will readily assume the shape of the portion of the nose of the wearer that it contacts. If desired, the locking ring may be formed with a continuous locking shoulder 12, as illustrated in Figures 6 and 7 of the drawing. The purpose of the small screw driver 13 is to permit the adjustment of the pad by the user, instead of requiring the constant trips to the opticians. The eyeglasses will be properly fitted by the optician when they are first purchased, and further trips to see him are eliminated. The screw driver is so small that it may be inserted in the lapel of a coat or carried the same way as a common pin.

So far as is known, the use of a conformable boot having a plurality of tits or teeth formed with a single shoulder each of which extend in the same direction, and taper off to the level of the boot is unknown in this or any other art. It will be readily understood that the slipping of the pad thus formed, will be definitely eliminated.

Many minor changes in detail of construction may be resorted to without departure from the spirit of the invention.

Having thus described my invention what I claim as new and desire to secure by Letters Patent of the United States is:

1. A nose pad for eyeglasses comprising a shell, an inner tube or sac positioned within the shell, a fluid within said sac, a conformable celluloid shoe on said sac formed with a plurality of shoulders facing in the same direction adapted to contact the nose of a wearer and to conform to the surface contour thereof under yieldable pressure, and a locking ring having a multiple point attachment with said shell for permitting adjustment of said sac and shoe.

2. A nose pad for eyeglasses comprising a shell, a follower positioned in the bottom thereof, an inner tube or sac disposed on said follower, a flexible and conformable boot disposed on the peripheral edge of the shell, and a locking ring having multiple point attachment with said shell for holding the several parts in their proper position and relation.

3. A nose pad for eyeglasses comprising a shell having a peripheral flange, a follower in said shell, a sac in said shell filled with a fluid, a conformable boot for engaging the nose, contacting the sac and having a plurality of shoulders facing in the same direction, and a locking ring, formed with a plurality of attaching points, secured to the edge of said shell to permit relative movement and adjustment between said shell and ring.

4. The subject matter as claimed in claim 3, said locking ring being adjustable with respect to said shell to permit the sac to become interposed between the peripheral flange on the shell and the under surface of the boot, whereby the surface of the boot may be adjusted with respect to the shell.

5. The subject matter as claimed in claim 3, means to permit the sac to become wedged between the peripheral flange about the shell and the under surface of the boot for effecting relative adjustment between the shell and boot, and means for adjusting the position of the follower to exert more or less pressure on the sac to effect the proper pressure on the boot, and in turn, on the nose when the pad is in position of use.

FRANK L. GRIER.